(12) United States Patent
Henry

(10) Patent No.: US 12,409,505 B2
(45) Date of Patent: Sep. 9, 2025

(54) METHOD AND APPARATUS FOR PROVIDING WELDING TYPE POWER

(71) Applicant: Illinois Tool Works Inc., Glenview, IL (US)

(72) Inventor: Andrew J. Henry, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 857 days.

(21) Appl. No.: 17/306,393

(22) Filed: May 3, 2021

(65) Prior Publication Data

US 2021/0252623 A1 Aug. 19, 2021

Related U.S. Application Data

(62) Division of application No. 14/802,443, filed on Jul. 17, 2015, now Pat. No. 11,014,182.

(51) Int. Cl.
| | | |
|---|---|---|
| *B23K 9/09* | (2006.01) | |
| *B23K 9/10* | (2006.01) | |
| *H02M 1/00* | (2007.01) | |
| *H02M 7/5395* | (2006.01) | |

(52) U.S. Cl.
CPC ............ *B23K 9/093* (2013.01); *B23K 9/1043* (2013.01); *H02M 7/5395* (2013.01); *H02M 1/0025* (2021.05)

(58) Field of Classification Search
CPC ... B23K 9/093; B23K 9/1043; H02M 7/5395; H02M 2001/0025
USPC ......... 219/130.21, 130.1, 130.33, 130.5, 136
See application file for complete search history.

(56) References Cited

U.S. PATENT DOCUMENTS

| | | |
|---|---|---|
| 6,115,273 A | 9/2000 | Geissler |
| 6,661,679 B1 | 12/2003 | Yang |
| 6,987,242 B2 * | 1/2006 | Geissler ............... B23K 9/1062 363/142 |

(Continued)

FOREIGN PATENT DOCUMENTS

| | | |
|---|---|---|
| CN | 104779799 A | 7/2015 |
| WO | 2014187956 A1 | 11/2014 |

OTHER PUBLICATIONS

Miller Dynasty 210 Maxstar 210 Owner's Manual, OM-270 536A, Jun. 2015, Miller Electric Mfg. Co., Appleton, WI.

(Continued)

*Primary Examiner* — Steven W Crabb
*Assistant Examiner* — Alba T Rosario-Aponte
(74) *Attorney, Agent, or Firm* — McAndrews, Held & Malloy, Ltd.

(57) ABSTRACT

A method and apparatus for providing welding-type power includes an input circuit, a power circuit, and a controller. The input circuit receives input power and provides intermediate power. The power circuit has a power control input with at least one switch that responds to the control input. The power circuit receives the intermediate power and provides welding type output power. The controller has a set point input and a control output. The control output is connected to the power control input. The control circuit also includes a pwm module that responds to the user set point input and provided the control output. The pwm module can include a short duty cycle linearizing module. The pwm module can also include a short duty cycle charging ramp module.

7 Claims, 8 Drawing Sheets

(56) References Cited

U.S. PATENT DOCUMENTS

| | | | |
|---|---|---|---|
| 2007/0075790 A1* | 4/2007 | Liao | H02M 3/156 331/36 C |
| 2008/0067993 A1* | 3/2008 | Coleman | H02M 3/156 323/282 |
| 2009/0122578 A1* | 5/2009 | Beltran | H02M 3/33523 363/16 |
| 2009/0230941 A1 | 9/2009 | Vogel | |
| 2010/0006551 A1 | 1/2010 | Geissler | |
| 2014/0306680 A1* | 10/2014 | Liu | G05F 1/468 323/288 |
| 2015/0340952 A1* | 11/2015 | Manohar | H02M 3/156 323/271 |
| 2016/0126836 A1* | 5/2016 | Schmitz | H02M 3/157 323/271 |
| 2016/0322908 A1 | 11/2016 | Chen | |

OTHER PUBLICATIONS

European Patent Office Search Report, Mar. 23, 2017, 80298 Munich Germany.
European Patent Office Communication, Jan. 26, 2018, 2280 HV Rijswijk Netherlands.
Shu Jiang Li et al, Intelligent Control of Spot Welding Inverter Based on Single Chip Microcomputer, 2006 IEEE Conference on Industrial Electronics and Applications, Singapore, May 24-26, 2006, Piscataway, NJ IEEE Service Center, US May 1, 2006 (May 1, 2006) pp. 1-4.

* cited by examiner

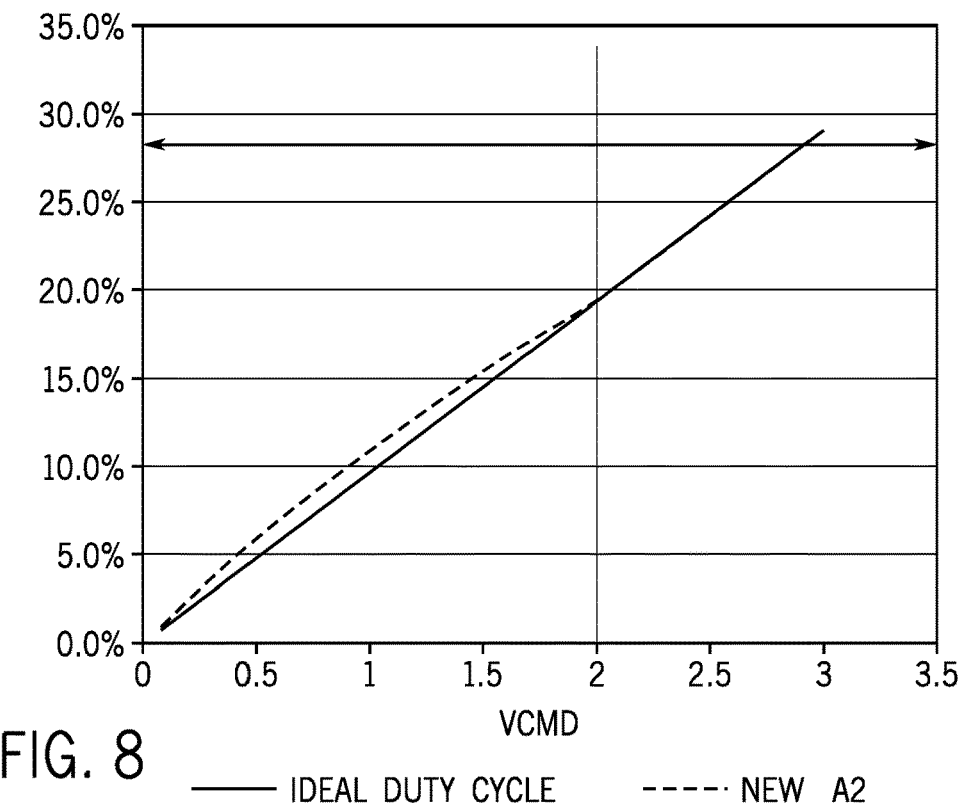
FIG. 8 —— IDEAL DUTY CYCLE  ---- NEW A2
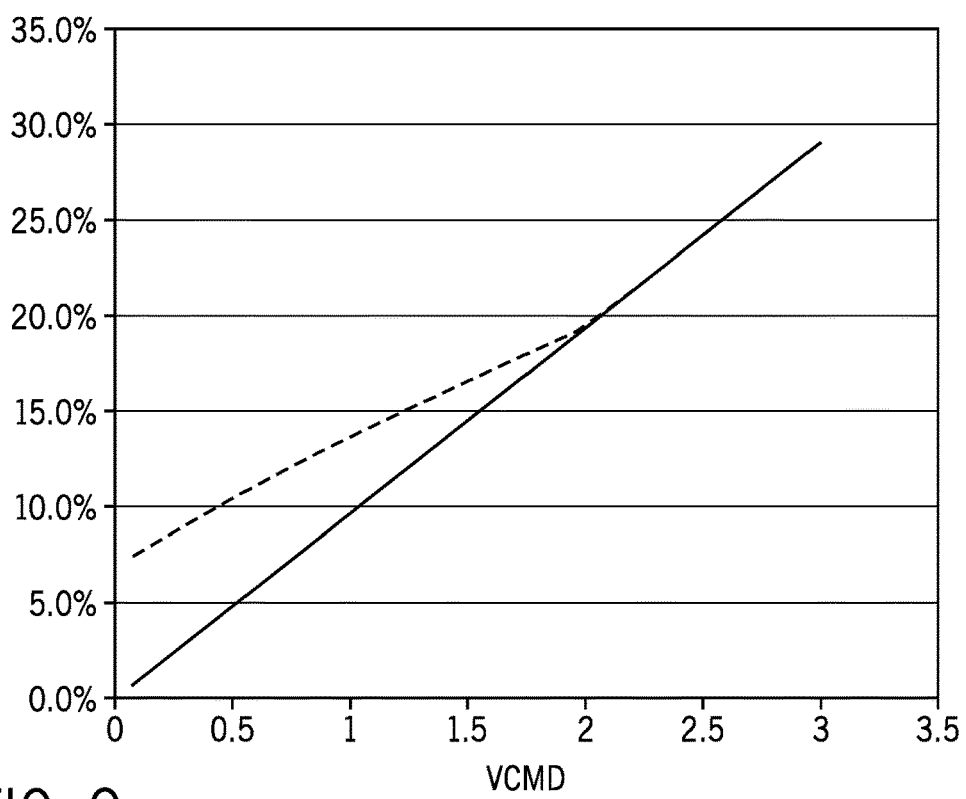
FIG. 9 —— IDEAL LINEAR RELATIONSHIP  ---- FREQ REDUCTION WITH GAIN CHANGE

METHOD AND APPARATUS FOR PROVIDING WELDING TYPE POWER

RELATED APPLICATIONS

This is a divisional of, and claims the benefit of the filing date of, U.S. patent application Ser. No. 14/802,443, filed on Jul. 17, 2015.

FIELD OF THE INVENTION

The present disclosure relates generally to the art of welding type power supplies. More specifically, it relates to welding type power supplies with pulse width modulated circuits.

BACKGROUND OF THE INVENTION

There are many known types of welding-type power supplies that provide welding type power. Welding type power, as used herein, refers to power suitable for electric arc welding, plasma arc cutting or induction heating. Welding type power supply, as used herein, refers to a power supply that can provide welding type power. Welding type systems are used to perform a variety of processes and used in a variety of settings. Welding type system, as used herein, is a system that can provide welding type power, and can include control and power circuitry, wire feeders, and ancillary equipment.

There are a variety of welding type processes, such as TIG, GMAW, sub arc, short circuit welding, catting, arc gouging and others. Some welding type systems are designed for a single process and others are designed for multiple processes. Many welding systems include switch based power circuits, such as inverters and converters. Such systems often include an input circuit, a power circuit, and a controller, as well as ancillary equipment such as wire feeders, robots, etc.

Input circuit, as used herein, refers to circuits configured to receive input power and to provide intermediate power, and may include as part thereof components and circuits such as rectifiers, transformers, saturable reactor, converters, filters, and/or magnetic amplifiers. Power circuit, as used herein, refers to the switches and components that cooperate to process power eventually provided as output power. Controller, as used herein, refers to digital and analog circuitry, discrete or integrated circuitry, microprocessors, DSPs, etc., and software, hardware and firmware, located on one or more boards, used to control a device such as a power supply, power source or power circuit.

Some welding type systems include a preregulator which provides a dc bus, followed by an inverter based output circuit. The preregulator conditions the input power, and provides a known dc bus. The inverter based output circuit receives the bus and provides the welding type power as an output. One successful design includes a boost circuit as part of the preregulator, and the output circuit includes an inverter, transformer, rectifier and output inductor. This type of welding type power supply is described in U.S. Pat. No. 6,987,242 (Geissler). Other welding type power supplies that have inverter based output circuits include U.S. Pat. No. 6,115,273 (Geissler) and Patent Publication 20090230941 (Vogel), all three of which are owned by the owner of this patent, and all three of which are hereby incorporated by reference. Other welding type power supplies include additional stages, or use other topologies for each stage (such as a buck preregulator, a combined rectifier-boost preregulator, a chopper instead of or following the inverter, a second inverter following the first inverter, etc.

Welding systems with converters, and particularly inverters, often use a PWM (pulse width modulation) control. PWM control provides for a fixed frequency (on time plus off time), and adjusts the duty cycle (on time) to obtain a desired output. Thus, in a forward type inverter topology, the power flow is regulated by modulating the duty cycle of the main power switches. The duty cycle is the ratio of the time the switch is on versus the total cycle time of the switching event.

A typical implementation of a welding type system is shown in FIG. 1 and includes a controller 101 that takes as inputs a required current setpoint and actual output values, and calculates the voltage command (or command signal) that will dynamically satisfy the required setpoint. This command signal (Vcom) is then transferred to a modulator 102 which is a PWM control circuit (amd can be aprt pof controller 101) that converts this signal (0-10V for example) to a pulse train with a duty cycle ($\alpha$) directly proportional to this signal. This modulated pulse train is then used to command on or off the power switches in an inverter (power circuit) 103, which will produce a voltage signal across an output stage 104 whose average is proportional to the duty cycle and the original command signal from controller 101. Feedback is provided by transducer 105.

An ideal modulator will produce a pulse train with a duty cycle $\alpha$ that is directly proportional to the command signal (vcom). $\alpha = t\_on/T = Gpwm*Vcom$, where Gpwm is the pwm gain. FIG. 2. shows the plot for $\alpha$ and vcom for an ideal pulse width modulator. An ideal continuous linear relationship between the command and the duty cycle helps the control loop of the entire systems to operate properly and remains stable regardless of the operating point. The slope (Gpwm) of this relationship, contributes to the overall gain of the closed loop control system, and must be taken into account to ensure stability of this system. Running at a fixed switching frequency (constant period T) the modulator maintains this relationship by reducing varying the on time t_on (pulse width) making it smaller or larger as needed (hence the term PWM).

FIG. 3 shows a pwm control ramp for a typical pwm control. Pwm control ramp, as used herein, refers to values that change with time and are compared to a V command, and the comparison is used to change states of the output. Such a ramp can be implemented using a saw tooth voltage ramp: a capacitor charged by a constant current source and discharged by a much larger current.

Inverter based output circuits offer many advantages, but they do have some drawbacks. One drawback is that pulse width modulators are not, in practice, ideal. The power circuit typically includes large transistors that take time to turn on and then back off again. T_on can therefore practically only be reduced to a finite minimum time. PWM minimum on time as used herein refers to the time it takes the switches being pulse width modulated to turn on and then off. Other practical circuit elements may also contribute to this minimum on time such as propagation delay from one circuit element to another, gate drivers dead times, etc. For example, an inverter with a period of T=10 μsec and a PWM minimum on time of 1 usec, the minimum duty cycle is 10%.

A duty cycle of no less than 10% is sufficient for many welding application but in low output welding, such as low end TIG, a duty cycle of 10% does not provide an output low enough to yield a stable consistent arc.

U.S. Pat. No. 6,661,679 shows a PWM controller having an adaptive off-time modulation. The Miller® Dynasty®

210 and Miller® Maxstar® attempt to address the minimum duty cycle of inverters by adjusting the pulse frequency. Since t_on cannot be reduced below the PWM minimum on time, T was increased to allow for smaller α. This is referred to as frequency reduction. This was an improvement over the prior art because it allowed for operation at low output.

FIG. 4 shows the prior art implementation of frequency reduction used for low output in the Miller® Dynasty®. The period is extended by reducing the discharge current from its normal level in proportion to how much Vcom is below Vcommand minimum. Vcommand minimum is the command signal that provides a pwm on time equal to the PWM minimum on time. This effectively extends the time it takes to reset the ramp down to Vmin and therefore stretches the period T. In this scheme i_dis*=Idis+Kd*Adjusted Vcom, where Adjusted Vcom<0 by definition and Kd is a constant chosen to set the amplitude of the frequency reduction. Adjusted Vcom=Vcom−Vcommand minimum.

One problem with this method for stretching the period is the resulting relationship between the duty cycle and the command signal becomes non-linear. FIG. 5 is a graph of a pwm transfer function—Vcom and the duty cycle α for both an ideal PWM and the prior art frequency adjusted PWM. Pwm transfer function, as used herein refers to the duty cycles provided for command signals (voltage, current, digital value inside a microprocessor, etc) over a range of command signals. Not only is the prior art pwm transfer function non linear below the PWM minimum on time (corresponding to Vcom=2 on the graph), there is a discontinuity in the slope of this relationship, which sets the gain of this stage in the system, and the slope changes a great deal as the duty cycle is reduced. Because the gain of the PWM stage using prior art frequency reduction is nonlinear, α can oscillate between 2% to 10%—the portion of the curve where the gain is the highest. This oscillation can be present in the arc, both visually and audibly.

When maintaining an arc at very low amperage the amount of power transferred is very low, requiring a low duty cycle. Additionally the arc characteristic at low amperage <10 A tend to be unstable, requiring a properly tuned closed loop control system to keep the arc at a proper constant current and stable. Sudden changes in gain (such as in the prior art control scheme) can lead to instability of the system when operating at the lower duty cycle. Low amperage operation can either be not very stable or an effort is made to avoid entering frequency reduction mode altogether at these operating points.

Another prior art method of reducing the frequency at low output power is to skip pulses. By skipping every other pulse the frequency is cut in half, skipping two pulses cuts the frequency to a third, etc. However, this produces a step wise pwm transfer function and is not linear TIG welding power sources are expected to output and regulate a very wide range of power outputs: for example the output of one unit can operate from 20 W to 6000 W providing good, stable current regulation over this entire range. Welding systems for other processes also operate at low output (relative to the maximum output), and have a similar need for stable operation. However, prior art welding type system also often have a control scheme that, as described above, results in instability at lower outputs.

Accordingly, a welding type system with PWM control that can more readily be stable when providing a low output is desired.

SUMMARY OF THE PRESENT INVENTION

According to a first aspect of the disclosure a welding-type system includes an input circuit, a power circuit, and a controller. The input circuit receives input power and provides intermediate power. The power circuit has a power control input and at least one switch that responds to the control input. The power circuit receives the intermediate power and provides welding type output power. The controller has a set point input and a control output. The control output is connected to the power control input. The control circuit also includes a pwm module that responds to the user set point input and provides the control output. The pwm module includes a short duty cycle linearizing module.

According to a second aspect of the disclosure a welding-type system includes an input circuit, a power circuit and a controller. The input circuit receives input power and provides intermediate power. The power circuit has a power control input and at least one switch that responds to the control input. The power circuit receives the intermediate power and provides welding type output power. The controller has a set point input and a control output, and the control output is connected to the power control input. The control circuit includes a pwm module that responds to the user set point input and provides the control output. The pwm module includes a short duty cycle charging ramp module.

According to a third aspect of the disclosure a method of providing welding-type power includes receiving input power, providing intermediate power, converting the intermediate power, providing welding type output power, and controlling the converting by pulse width modulating the converter. Pulse width modulating includes, for shorter duty cycles, linearizing a pwm transfer function by providing a pwm transfer function that is closer to linear than the transfer function provided absent linearizing.

The pwm module has a pwm transfer function with a first linear gain and the short duty cycle linearizing module has a short duty cycle pwm transfer function with a second linear gain, and the second linear gain is not the first linear gain, in one alternative.

The power circuit is includes an inverter circuit in another alternative.

The input circuit power circuit includes a preregulator in one embodiment.

The short duty cycle linearizing module includes a short duty cycle charging ramp module in various embodiments, and the short duty cycle charging ramp module can include at least a part of the short duty cycle linearizing module.

The short duty cycle charging ramp module includes an active threshold equal to a command minimum on time for the power circuit in another embodiment.

The short duty cycle linearizing module provides an adjusted command signal and the control output is responsive to the adjusted command signal in various embodiments.

Other principal features and advantages of will become apparent to those skilled in the art upon review of the following drawings, the detailed description and the appended claims.

BRIEF DESCRIPTION OF THE DRAWINGS

FIG. 8 is graph of a linearized pwm transfer function;

FIG. 9 is graph of a linearized pwm transfer function; and

Figure 1:
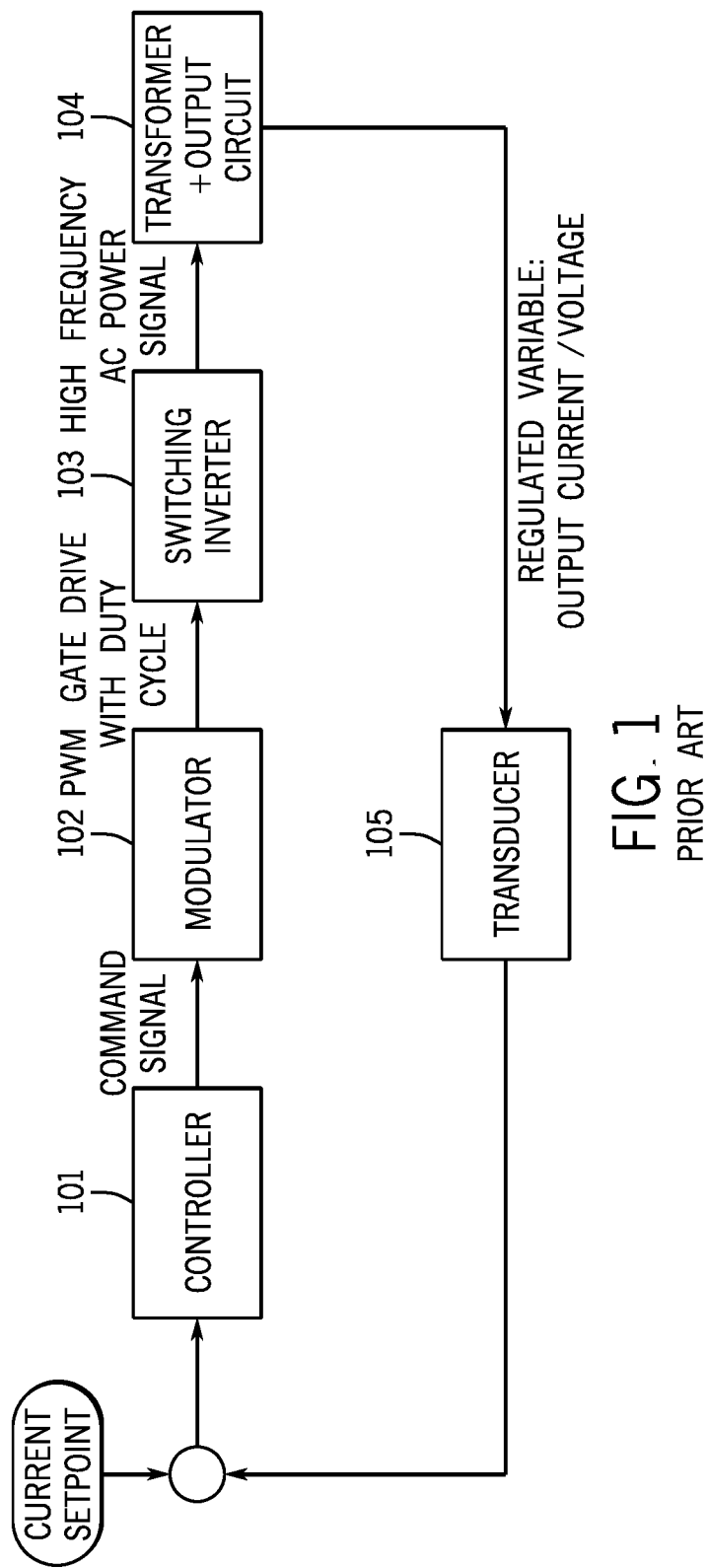
FIG. 1 is block diagram of a prior art welding system.
Figure 2:
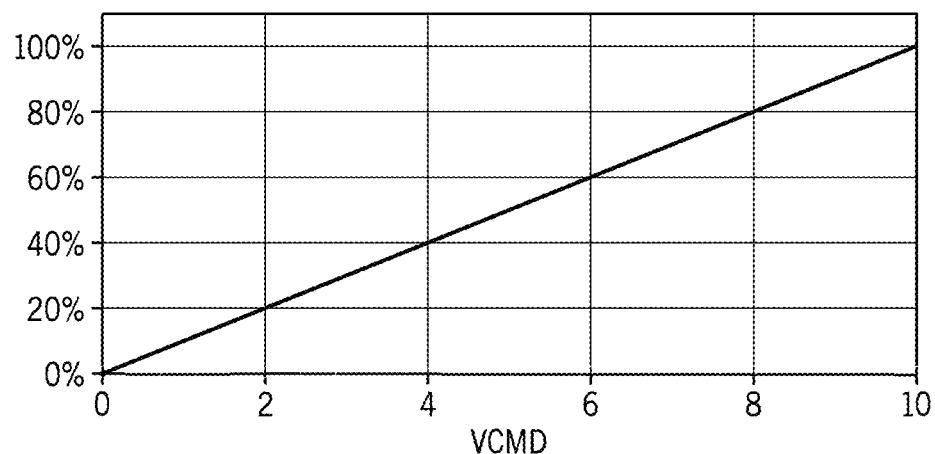
FIG. 2 is graph of an ideal pwm transfer function.
Figure 3:
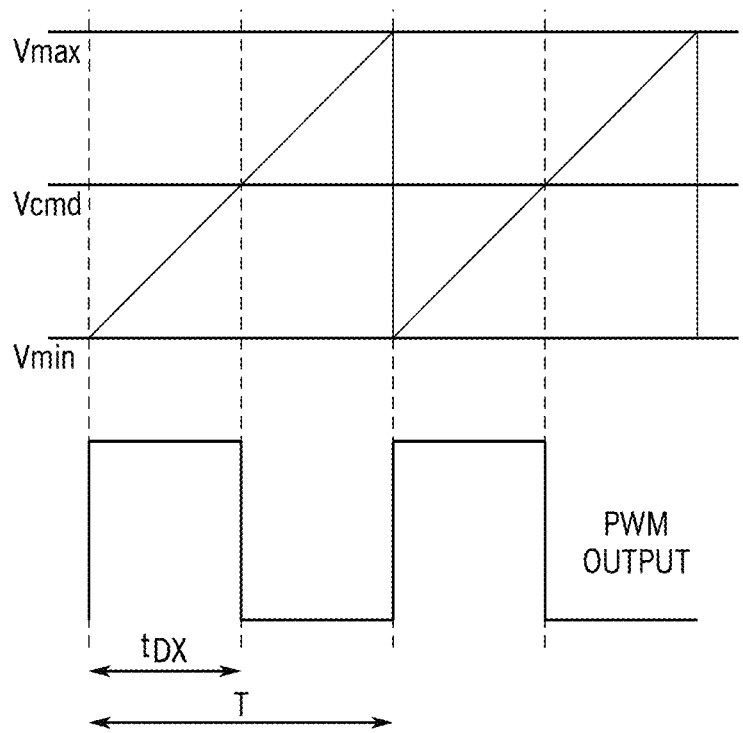
FIG. 3 is graph of a prior art pwm control ramp.
Figure 4:
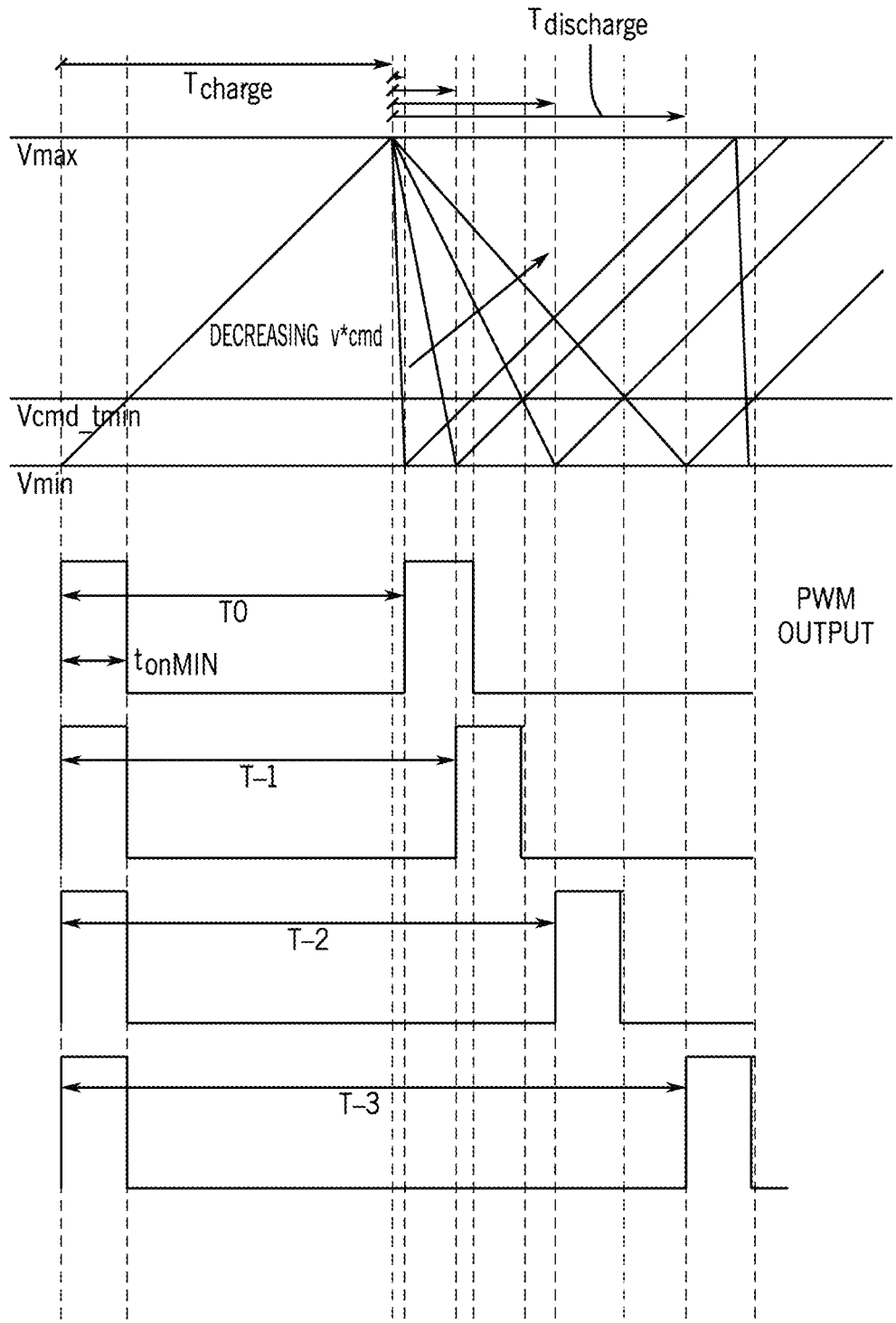
FIG. 4 is graph of a prior art adjusted pwm control ramp.
Figure 5:
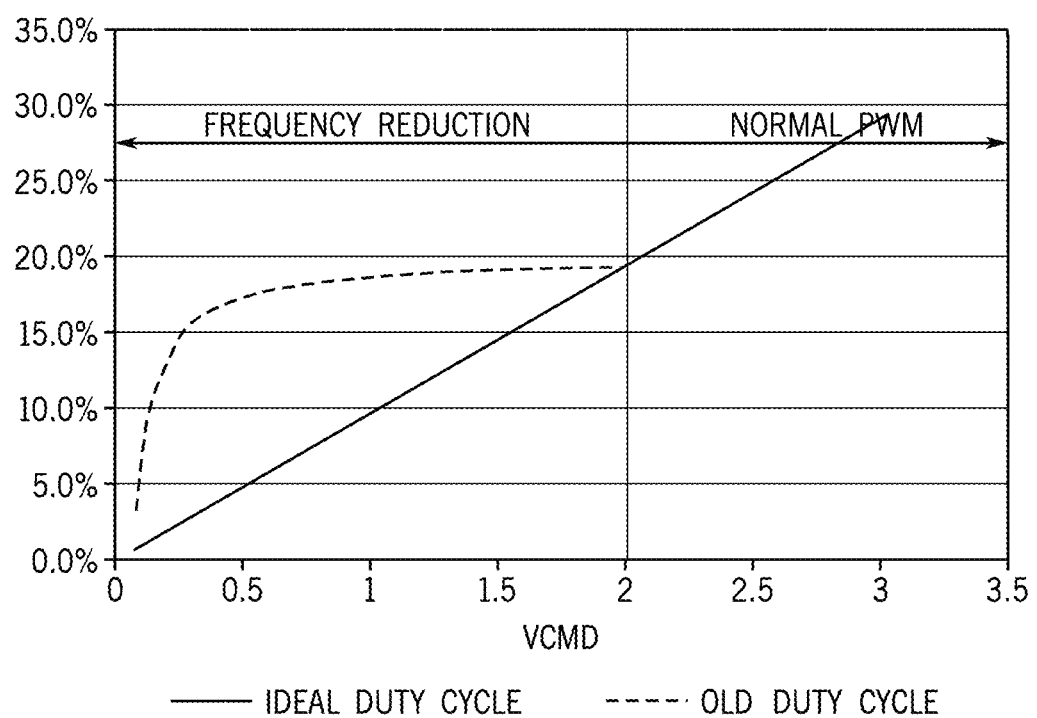
FIG. 5 is graph of a prior art and ideal pwm transfer functions.

Before explaining at least one embodiment in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

Figure 10:
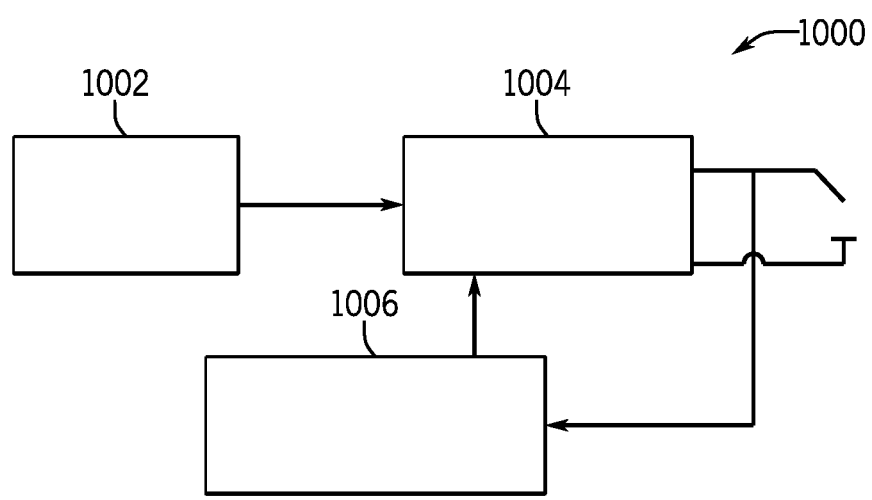
FIG. 10 is diagram of a welding type system.

While the present disclosure will be illustrated with reference to particular circuitry and controls, it should be understood at the outset that the invention can also be implemented with other circuitry and controls, and used for other welding type processes. The preferred embodiment is shown in FIG. 10 and implemented with a welding type system 1000 that includes an input circuit 1002, a power circuit 1004, and a controller 1006. The input circuit 102, power circuit 104 and controller 106 may be in accordance with the prior art, such as that shown in U.S. Pat. No. 6,987,242 (Geissler), U.S. Pat. No. 6,115,273 (Geissler) and Patent Publication 20090230941 (Vogel), except for the frequency reduction described herein. Input circuit 1002 is preferably a preregulator, such as that shown in U.S. Pat. No. 6,987,242. Power circuit 1004 is preferably an inverter, such as that shown in FIG. 1 or U.S. Pat. No. 6,987,242. Controller 1006 can be analog, digital, or a combination thereof, and includes the frequency reduction modules described below.

One embodiment provides for using the system of FIG. 1, with the controller and/or modulator modified to include a pwm module that functions as described below.

Generally, the invention provides for controlling a welding type system at low power such that it operates in a stable manner. This is preferably accomplished by linearizing the pwm transfer function at shorter duty cycles. Linearizing the pwm transfer function, as used herein, refers to providing a pwm transfer function that is closer to linear than the transfer function provided absent the linearizing. Pulse skipping does not linearize the pwm transfer as linearizing the pwm transfer function is used herein. Shorter duty cycle as used herein refers to a duty cycle where the on time would be less than the PWM minimum on time, without a frequency reduction.

One embodiment provides for linearizing the pwm transfer function at shorter duty cycles by changing the slope of the charging ramp when the voltage command is less than Vcommand minimum. Vcommand minimum is the command signal that provides a pwm on time equal to the PWM minimum on time.

Figure 6:
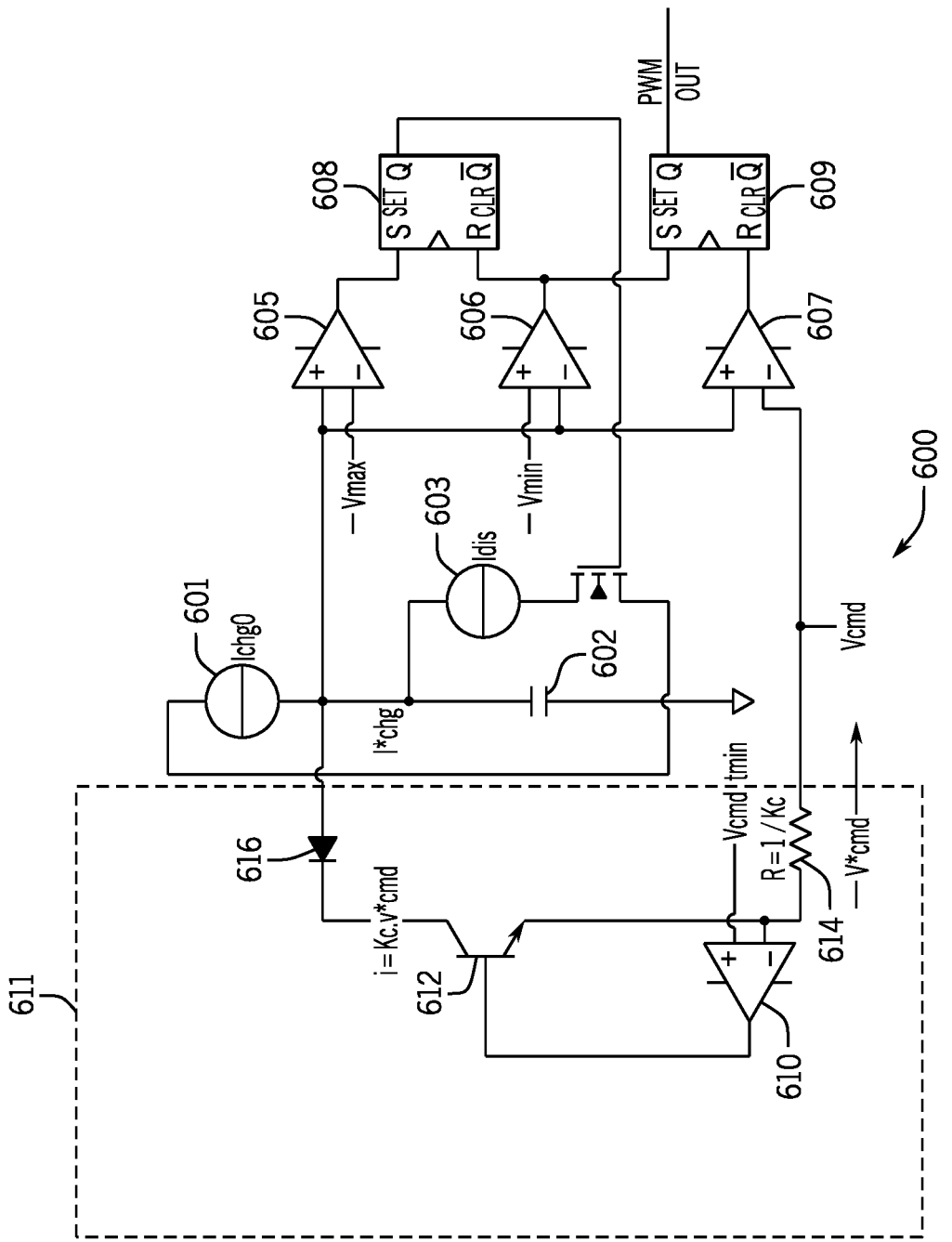
FIG. 6 is diagram of a circuit that creates a pwm control ramp.

The preferred embodiment includes a pwm module that is similar to prior art pwm modules, but with added components and function. Pwm module, as used herein, refers to a module that provides a pwm control ramp. Module, as used herein, refers to software and/or hardware that cooperates to perform one or more tasks, and can include digital commands, control circuitry, power circuitry, networking hardware, etc. A typical pwm module 600 is shown in FIG. 6, but is modified in a new way to reduce the charging current for shorter duty cycles, after the ramp exceeds V_(cmd_t min)—also called Vcommand minimum. Shorter duty cycle as used herein refers to a duty cycle where the on time would be less than the PWM minimum on time, without a frequency reduction. New components include an op amp 610, a transistor 612, a resistor 614 and a diode 616.

First, the operation at other than shorter duty cycles will be described. In this range the circuit of FIG. 6 functions as a typical pwm module. A constant current source 601 charges a capacitor 602. A much larger current source 603 discharges capacitor 602. Comparators 605, 606 and 607 compare the voltage on capacitor 602 to Vmax, Vmin, and Vcom (the command voltage or signal). When constant current source 601 is charging capacitor 602 and the voltage on capacitor 602 exceeds Vcom the output is commanded off. When the voltage on capacitor 602 reaches Vmax, current source 603 begins to discharge capacitor 602 and the voltage rapidly decreases. When the voltage on capacitor 602 decreases to Vmin the output is commanded on, current source 603 is turned off, and the voltage on capacitor 602 rises, until it exceeds Vcom. Then the process repeats. Flip flops 608 and 609 change state as the various voltage thresholds are crossed.

When operating at low output power the preferred embodiment linearizes the pwm transfer function. Specifically, at shorter duty cycles—i.e, where the on time would be less than the PWM minimum on time without a frequency reduction. The preferred embodiment provides that the charge current to the capacitor is reduced after the voltage has reached V_(cmd_t min) (for shorter duty cycles). This adjusts the pwm control ramp so that the pwm frequency is reduced, and does so in a continuous and largely linear fashion.

The circuit of FIG. 6 includes a short duty cycle linearizing module 611 comprised of op amp 610, transistor 612, resistor 614 and diode 616, that cause the charge current to capacitor is 602 to be reduced after the voltage has reached V_(cmd_t min)—also called Vcommand minimum, and its operation and effect will be described below. Vcommand minimum is the command signal that provides a pwm on time equal to the PWM minimum on time. Short duty cycle linearizing module, as used herein, refers to a module that is operable for at least some shorter duty cycles and provides a pwm transfer function that is closer to linear than the transfer function provided absent the short duty cycle linearizing module. Also, short duty cycle linearizing module 611 combined with current source 601 are a short duty cycle charging ramp module. Short duty cycle charging ramp module, as used herein, refers to a module that is operable for at least some shorter duty cycles and provides a pwm transfer function that has a pwm charging ramp with a slope that is reduced as the charge current is reduced when the command is below an active threshold.

Figure 7:
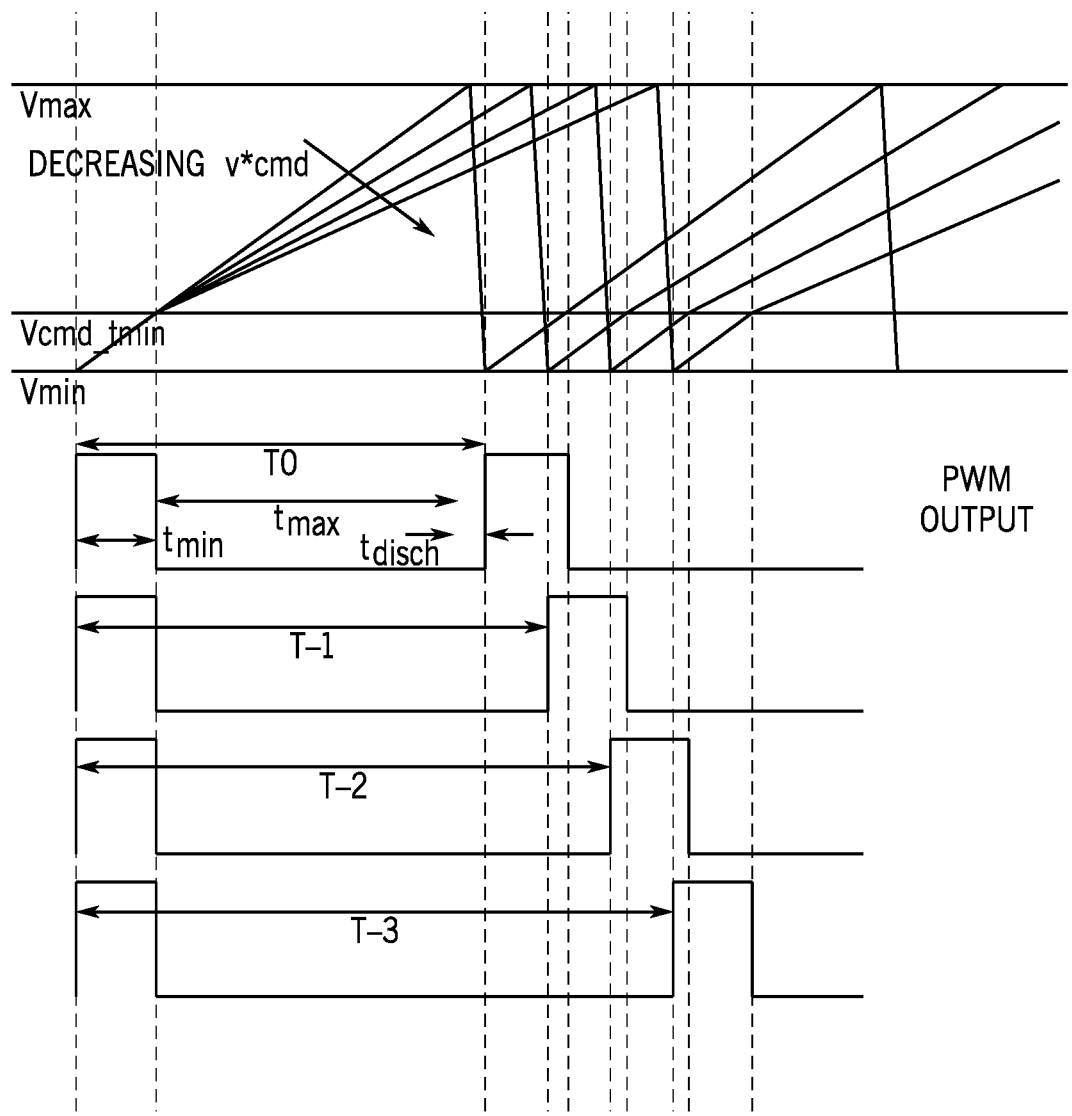
FIG. 7 is graph of a pwm control ramp.

The reduction occurs when the duty cycles are shorter, so that the time on is the minimum on time. By reducing the ramp slope after this time, the off time is increased, and the duty cycle is decreased. FIG. 7 shows adjusted pwm control ramps for this embodiment. After reaching V_(cmd_t min), the slope of the charging ramp decreases as the charge current is reduced.

Short duty cycle linearizing module 611 and the short duty cycle charging ramp module operate as follows in the preferred embodiment. Op amp 610, transistor 612, resistor 614 and diode 616 reduce charging current to capacitor 602 and adjust Vcommand when operating at shorter duty cycles and when the ramp is above Vcommand minimum. The inputs to the op amp are V_(cmd_t min) and the adjusted Vcom. Short duty cycle linearizing module 611 has an active threshold equal to the command minimum on time for the power circuit, and is set by the input to op amp 610. Alternatives use other circuits to implement the slower charging rate. Another alternative provides that the ramp and/or Vcom and/or adjusted Vcom are implemented with software. FIG. 6 is an ideal version of a short duty cycle linearizing module and short duty cycle charging ramp module. In practice, additional components may be used in accordance with common engineering practices to implement a practical version of the simple diagram of FIG. 6.

The circuitry will reduce the charge current in a linear fashion as explained below:

$$Adj.I\_chg = I\_chg0 + Kc*Adj.V\_cmd, \text{ where Adj } V\_cmd = v\_cmd - V\_(cmd\_t \min) < 0, \text{ and } I\_chg0 \text{ is the charge at } V\_(cmd\_t \min).$$

Thus:

$$Adj\ i\_chg = I\_chg0 + Kc*Adj.v\_cmd$$

$$Adj\ i\_chg = I\_chg0*(1+A*Adj.\ v\_cmd)$$

A is defined as $A = Kc/I\_chg0$

Then:

$$T = t\_\min + C*(V\_\max - V\_(cmd\_t \min))/(Adj.i\_chg) + t\_disch$$

$$T = t\_\min + C*(V\max - V\_(cmd\_t \min))/(I\_chg*(1+A*Adj.v\_cmd)) + t\_disch$$

$t\_\max$ is defined as $t\_\max = C(V\max - V\_(cmd\_t \min))/I\_chg0$,
then $t\_\max = t\_charge0 - t\_\min$
and $T0 = t\_charge0 + t\_disch$
This gives a period T of:

$$T = t\_\min + t\_\max/((1+A*Adj.\ v\_cmd)) + t\_disch$$

From this the duty cycle in frequency reduction mode can be calculated:

$$\alpha(Adj.\ v\_cmd) = t\_\min/(t\_\min + t\_\max/((1+A*Adj.v\_cmd)) + t\_disch)$$

$$\alpha(Adj.\ v\_cmd) =$$

$$(t\_\min(1+A*Adj.\ v\_cmd))/((t\_\min + t\_disch)(1+A*Adj.\ v\_cmd) + t\_charge0 - t\_\min)$$

$$\alpha(Adj.v\_cmd) = (t\_\min(1+A*Adj.v\_cmd))/((t\_\min + t\_disch)(A*Adj.v\_cmd) + (t\_charge0 + t\_disch))$$

$$\alpha(Adj.v\_cmd) = (t\_\min(1+A*Aadj.v\_cmd))/((t\_\min + t\_disch)(A*Adj.v\_cmd) + T\_0)$$

And, $(A*Adj.v\_cmd) \varepsilon [-1,0]$, and if both $t\_\min$ and $t\_disch << T\_0$ Then the relationship between duty cycle and command voltage is approximated to: $\alpha(Adj.\ v\_cmd) = (t\_\min/T\_0)*(1+A*Adj.\ v\_cmd)$ The pwm transfer function for this embodiment (the relationship between $\alpha$ and Adj. v_cmd) is plotted in FIG. 8, along with the ideal pwm transfer function, and as can be seen the pwm transfer function for this embodiment is linearalized.

The slope of the relationship (gain of the system) is almost constant over the entire range. With the same simplifying assumptions as above, $$d\alpha/dAdj.v\_cmd = (A*t\_\min*T\_0)/(T\_0)^2 = A*t\_\min/T\_0$$

This gain is constant and by selection of the parameter A the slope the frequency reduction can be made to match that of the modulator in the normal mode, therefore offering a good transition between normal operation and frequency reduction modes (i.e, above and below Vcommand minimum. This difference between the ideal transfer function and one described herein is 0 at V_(cmd_t min) and 0V. The maximum difference occurs at a command voltage of (Adj. v_com) diff max=$(-T\_0 + \sqrt{T\_0*(T\_0 - t\_\min - t\_disch)})/(t\_\min + t\_disch)*A$ Circuit parameters that the inventor has found work well and were used for the graph of FIG. 8 include capacitor 601=1 nF, Vmax=10V, Vmin=0V, Vcmd_min (Vcommand minimum)=2V, Icharge=1 mA, B=30 (Discharge to charge ratio), Kd=15 mA/V (Discharge reduction rate), and Kc=0.5 mA/V (Charge reduction rate set by resistor 614), with A=0.5 1/V.

Other parameters can be chosen, to maintain a linear relationship such as that shown in FIG. 8. Choosing the parameter $A = K\_c/I\_chg0$ so that $A*V\_(cmd\_t \min) = 1$ gives a largely linear relationship. The duty cycle will then decrease down to 0% at 0V of Vcmd. Alternatively, the short duty cycle linearizing module could be implemented to have the gain change slightly at light load. This could be used to adapt to the overall gain of the system which can change with different arc conditions. A different value of the A parameter can accomplish this. Choosing A lower than ideal will reduce the gain, but the duty cycle will not reach 0 at 0V command. This is illustrated in FIG. 9 with $A*V\_(cmd\_t \min) = 0.7$. Other alternatives provide for other pwm transfer functions Numerous modifications may be made to the present disclosure which still fall within the intended scope hereof. Thus, it should be apparent that there has been provided a method and apparatus for a welding type system with frequency reduction and linearized pwm transfer function that fully satisfies the objectives and advantages set forth above. Although the disclosure has been described specific embodiments thereof, it is evident that many alternatives, modifications and variations will be apparent to those skilled in the art. Accordingly, the invention is intended to embrace all such alternatives, modifications and variations that fall within the spirit and broad scope of the appended claims.

The embodiments of the invention in which an exclusive property or privilege is claimed are defined as follows:

1. A method of providing welding-type power, comprising:
    receiving input power and providing intermediate power in response to the input power;
    converting, via a converter, intermediate power to provide welding type output power;
    controlling the converting by pulse width modulating the converter, including, for at least some shorter duty cycles, linearizing a pwm transfer function by providing a second pwm transfer function that is closer to linear than the pwm transfer function provided absent linearizing.

2. The method of claim 1, wherein pulse width modulating the converter includes providing the pwm transfer function with a first linear gain over a first range and wherein linearizing the pwm transfer function includes providing the second pwm transfer function with a second linear gain for shorter duty cycles, wherein the second linear gain is not the first linear gain.

3. The method of claim 2, wherein converting intermediate power includes inverting intermediate power.

4. The method of claim 3, wherein receiving input power and providing intermediate power includes preregulating input power.

5. The method of claim 3, wherein linearizing a pwm transfer function includes providing the second pwm transfer function that has a pwm charging ramp with a slope that is reduced as the charge current is reduced when a command signal is below an active threshold.

6. The method of claim 5, wherein the active threshold is equal to a command minimum on time.

7. The method of claim 6, wherein linearizing a pwm transfer function includes providing an adjusted command signal.

* * * * *